United States Patent [19]
Brannon et al.

[11] Patent Number: 4,722,028
[45] Date of Patent: Jan. 26, 1988

[54] NIGHT VISION COMPATIBLE AND SUNLIGHT READABLE, LIGHTED, WORD INDICATING PUSHBUTTON SWITCH AND INDICATOR

[75] Inventors: William E. Brannon, Buena Park; James F. Gust, Temucula; Henry Castro, Santa Ana, all of Calif.

[73] Assignee: Staco Switch, Costa Mesa, Calif.

[21] Appl. No.: 872,560

[22] Filed: Jun. 10, 1986

[51] Int. Cl.$^4$ ............ G01D 11/28; F21V 13/00; F21V 21/14
[52] U.S. Cl. ............ 362/29; 362/231; 362/242; 362/293
[58] Field of Search ............ 362/23, 29, 230, 231, 362/235, 242, 293

[56] References Cited

U.S. PATENT DOCUMENTS

| | | | |
|---|---|---|---|
| 1,666,041 | 4/1928 | Buchanan | 362/235 X |
| 2,751,584 | 6/1956 | Isborn | 362/23 X |
| 3,473,015 | 10/1969 | Haas et al. | 362/293 |
| 4,318,158 | 3/1982 | Livermore et al. | 362/293 X |
| 4,479,173 | 10/1984 | Rumpakis | 362/293 X |
| 4,535,396 | 8/1985 | Guthrie | 362/29 X |
| 4,559,582 | 12/1985 | Scardilli et al. | 362/23 |
| 4,580,196 | 4/1986 | Task | 362/226 X |
| 4,581,683 | 4/1986 | Reiter et al. | 362/23 X |
| 4,614,316 | 9/1986 | Marvin et al. | 362/23 X |

FOREIGN PATENT DOCUMENTS 580427  9/1946  United Kingdom .................. 362/23

Primary Examiner—Allen M. Ostrager
Attorney, Agent, or Firm—George F. Bethel; Patience K. Bethel

[57] ABSTRACT

A pushbutton switch having an illuminated display or other instrumentation data or control display device is made compatible both with unassisted night time vision of the display as well as vision assisted by a night vision imaging system or night vision goggles. The display is backed with a plurality of selectively activated light sources. Each light source is characterized by a spectral range. At least one of the light sources has a spectral range compatible with the night vision imaging system. At least another one of the light sources has a spectral range compatible with unassisted night vision. In the preferred embodiment, the light source is comprised of a conventional incandescent bulb disposed within a domed glass filter. The domed glass filter has a spectral transmissivity which is compatible with the night vision imaging system. In particular, the filter has a transmissivity approximately equal to either ANVIS Green A, ANVIS Green B, or Yellow. The light source compatible with unassisted night vision is comprised of a conventional incandescent bulb disposed in a domed filter having a spectral transmissivity within the red portion of the spectrum. The display may be selectively illuminated by any one of the ANVIS colors, a combination of the ANVIS colors, or by the red night light. Therefore, every displayed instrumentation device within the cockpit of an aircraft may be immediately converted from conventional night vision illumination to one compatible with night vision goggles.

13 Claims, 4 Drawing Figures

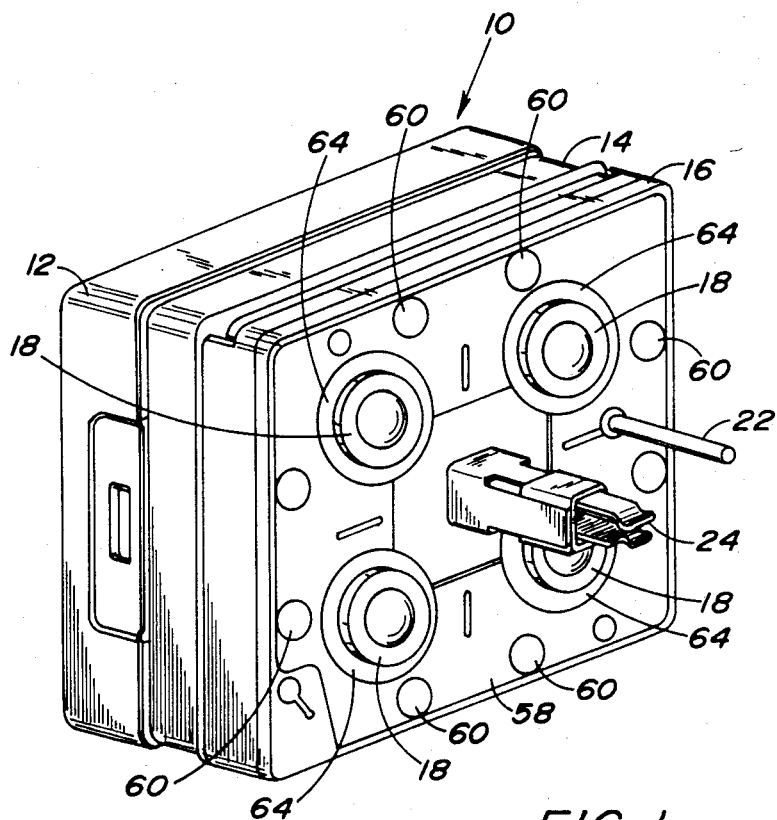
FIG. 1
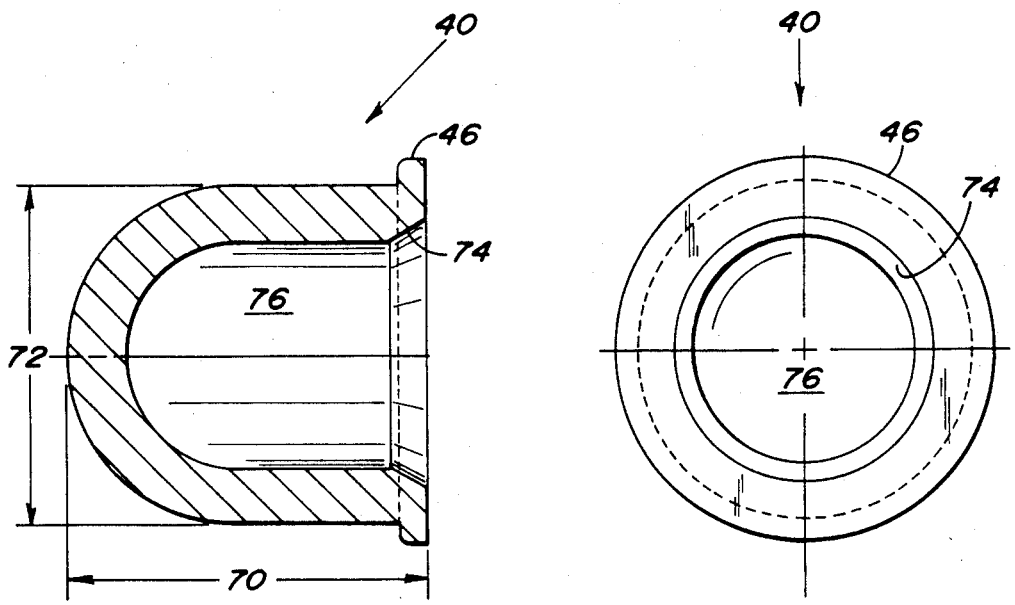
FIG. 3
FIG. 4

NIGHT VISION COMPATIBLE AND SUNLIGHT READABLE, LIGHTED, WORD INDICATING PUSHBUTTON SWITCH AND INDICATOR

BACKGROUND OF THE INVENTION

1. Field of the Invention

The invention relates to the field of lighted indicators and in particular to indicators which are particularly adapted for use in combination with night vision goggles.

2. Description of the Prior Art

Night vision goggles are binocular-like device which amplifies low levels of visual or near infrared energy available in typical night time environments to allow the user's vision under starlight to approach that of daytime illumination. Night vision goggles are used extensively in helicopters, aircraft, tanks, troop carriers, combat and landing craft by military, police, and rescue personnel.

It is further long been known in the aeronautic and marine applications to illuminate instrument panels in cockpits or wheelhouses with dim red light. However, night vision goggles are generally saturated by red light so that a pilot wearing a pair of night vision goggles, upon glancing down at the instrument panel, would be subjected to a visual "white-out". This means that the instruments within the vehicle have to be read by a co-pilot who is not wearing night vision goggles, or else the goggle-wearing pilot must lift off or look below the night vision goggles to read the cockpit instruments.

The use of any color other than red will result in a similar vision "white-out" with unaided eyes in attempting to operate in night time environments or create a cabin reflection or glow which can be detected and used as a homing signal for hostile ballistics.

In order to provide cockpit lighting which is compatible both with night vision goggles and unaided vision at night, many techniques have been unsuccessfully attempted. These techniques include spectral separation of the illuminating light relative to the portion spectrums in which the night vision goggles are sensitive. Spectral separation has been accomplished by electro-illuminescent lighting, filters, and the use of frequency specific light emitting diodes. Attempts have also been made to alter the geometry of fixtures of lighted elements to avoid interference. Such fixtures have included such elements as baffles, microlouvers, selected appropriate location of lighting and utilization of controlled reflections. In addition thereto attempts have been made to absorb as much as the nonuseful light in the cockpit as possible through the use of flat black interiors, black flight suits, and antireflection coatings and treatments on all surfaces within the cockpit. None of these prior art attempts have provided a fully satisfactory or practical solution.

Therefore, what is needed is some type of illumination device, particularly adapted for use in indicators or push button switches, which can be compatibly used at night both with unaided vision and by vision aided by night vision goggles.

BRIEF SUMMARY OF THE INVENTION

The invention is an apparatus for selectively illuminating a display which is compatible with unassisted night vision illumination and with a night vision imaging system. The apparatus comprises a light box, and a plurality of three-dimensional filter elements disposed in the light box. The light box is disposed behind the display. At least one of the three-dimensional filter elements has a predetermined spectral transmissivity compatible with the night vision imaging system. A mechanism is provided for selectively illuminating the plurality of the three-dimensional filter elements. As a result, the apparatus illuminates the display in compatible manner with night vision imaging systems.

At least one other one of the plurality of three-dimensional filter elements has a spectral transmissivity in a wavelength range compatible with unassisted night vision.

In one embodiment, approximately one half of the plurality of three-dimensional filter elements has a spectral transmissivity compatible with the night vision imaging system, and each of the remaining one of the plurality of three-dimensional filter elements has a spectral transmissivity and wavelength range compatible with assisted night vision.

In the preferred embodiment, at least one of the three-dimensional filter elements is dome shaped.

In the preferred embodiment, at least one three-dimensional filter elements has a spectral transmissivity approximately equal to ANVIS Green A, ANVIS Green B or ANVIS Yellow.

Preferably at least another one of the plurality of three-dimensional elements has a spectral transmissivity compatible with unaided night vision.

The invention can also be characterized as an apparatus for illumination of a display for unassisted daylight vision, unassisted night vision, and vision with a night vision imaging system comprising a plurality of light sources, and a corresponding plurality of individual filter elements disposed over each light source. The light is emitted by the light source and transmitted through the corresponding filter element. The transmitted light is characterized by the spectral transmissivity of each corresponding filter element. At least one of the filter elements is characterized by a spectral transmissivity compatible with the night vision imaging system and at least one other one of the plurality of filter elements has a spectral transmissivity compatible with a selected one of the daytime vision and unassisted night vision. A light box is provided for receiving the plurality of filter elements and light sources contained within the filter elements. The light box is characterized by an internal reflecting surface. A mechanism for embodying the display is also included and is disposed in or on the light box opposing the plurality of filter elements and light sources disposed within the light box. As a result a single apparatus is provided for illumination of the display under variable spectral vision illumination conditions.

The invention is still further characterized as a method for selectively providing illumination of a display with a selected spectral range compatible with a night vision imaging system, unassisted daytime vision, and unassisted night vision. The method comprises the steps of selectively activating the light source enclosed within a three dimensionally shaped filter. The filter has a selected spectral transmissivity corresponding to the night vision imaging system. Next follows the step of selectively illuminating a second light source enclosed within the three dimensionally shaped filter disposed adjacent to the display. The second filter has a spectral transmissivity compatible with the unassisted night vision. Both the first and second light sources are then selectively activated to illuminate the display with a spectral range compatible with the unassisted daytime vision.

The invention and its various embodiments may better be understood by now turning to the following Figures wherein like elements are referenced by like numerals.

BRIEF DESCRIPTION OF THE DRAWINGS

FIG. 1 is a rear perspective view of a portion of a push button switch incorporating the invention.

FIG. 3 is a cross-sectional view of a filter glass element shown in FIG. 2.

FIG. 4 is a rear plan view of the glass element depicted in FIG. 3.

Figure 2:
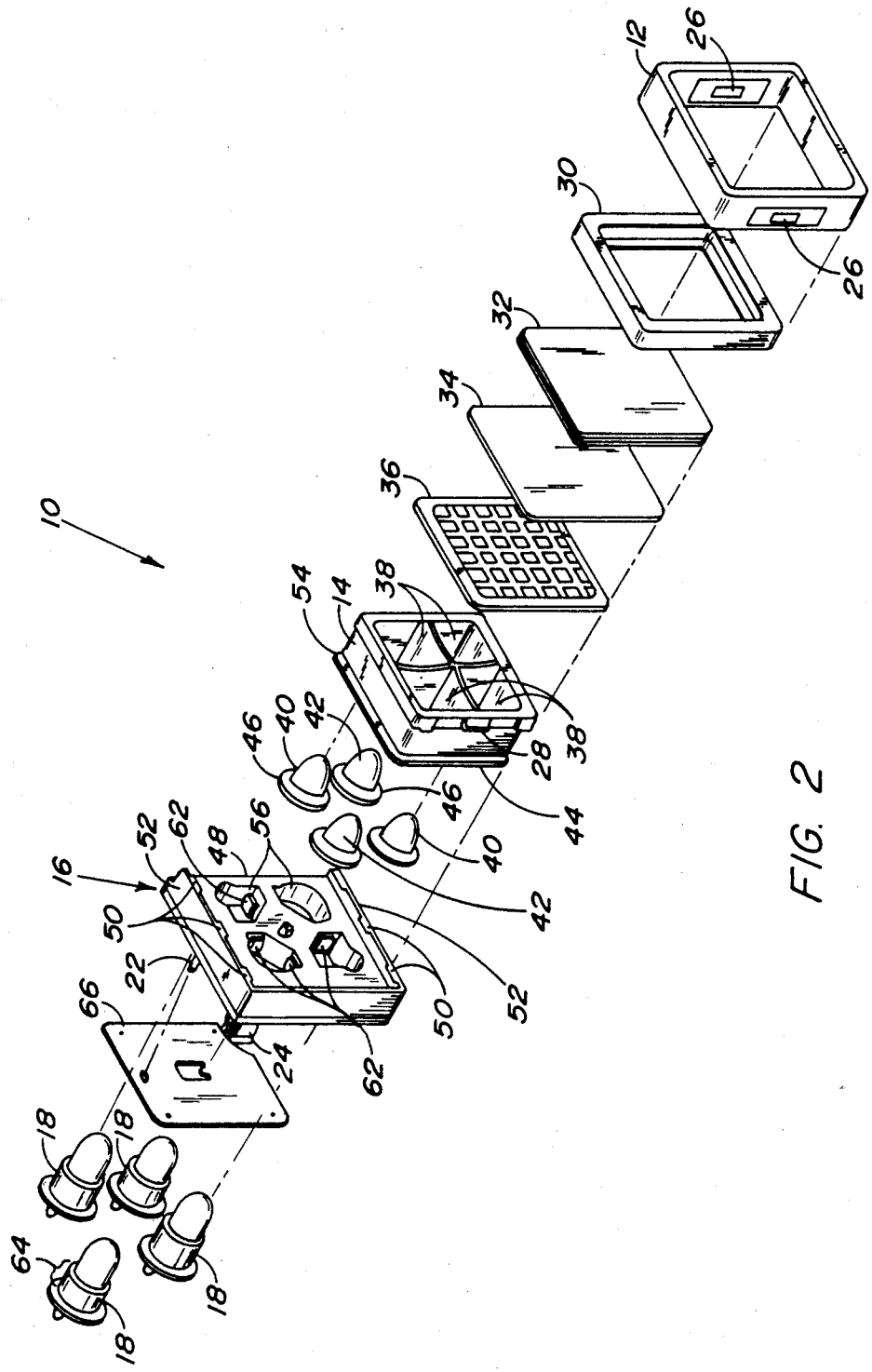
FIG. 2 is an exploded perspective view of that portion of the switch shown in FIG. 1 as seen from the front.

The invention and its various embodiments may be better understood by turning to the following detailed description.

DETAILED DESCRIPTION OF THE PREFERRED EMBODIMENTS

A pushbutton switch having an illuminated display or other instrumentation data or control display device is made compatible both with unassisted night time vision of the display as well as vision assisted by a night vision imaging system or night vision goggles. The display is backed with a plurality of selectively activated light sources. Each light source is characterized by a spectral range. At least one of the light sources has a spectral range compatible with the night vision imaging system. At least another one of the light sources has a spectral range compatible with unassisted night vision. In the preferred embodiment, the light source is comprised of a conventional incandescent bulb disposed within a domed glass filter. The domed glass filter has a spectral transmissivity which is compatible with the night vision imaging system. In particular, the filter has a transmissivity approximately equal to either ANVIS Green A, ANVIS Green B, or Yellow. The light source compatible with unassisted night vision is comprised of a conventional incandescent bulb disposed in a domed filter having a spectral transmissivity within the red portion of the spectrum. The display may be selectively illuminated by any one of the ANVIS colors, a combination of the ANVIS colors, or by the red night light. Therefore, every displayed instrumentation device within the cockpit of an aircraft may be immediately converted from conventional night vision illumination to one compatible with night vision goggles.

Night vision compatibility in the context of the present application is defined as crew station interior lighting that provides acquisition of interior information with the unaided eye without degrading the image intensification capability of night vision imaging systems to detect an outside scene during night time operations. Although night goggles are not generally used to read interior information, occasions do exist in which information must be read through the night vision goggles, such as occurs in head-up displays and warning and master caution indicators which are viewed through the goggles with the goggles focused at infinity. According to the invention, compatibility is accomplished by controlling the spectral radiation, luminance and chromaticity of the crew station lighting emitting source.

Turn now to FIG. 1 where a illuminated display portion of a pushbutton switch, generally denoted by reference numeral 10, is illustrated in a rear perspective view. Portion 10 is the front end of a push button switch which carries the illumination source according to the invention. Portions related to the switching function have been omitted for the sake of clarity. In any case, the switch, which is connected to the illuminated pushbutton portion 10, is conventional, and is sold by Staco Switch, Staco Inc. of Costa Mesa, California, as switch model No. 90. Hence, the details of the switching action which is actuated by depression of pushbutton 10 will not be discussed, and do not generally pertain to the invention.

The perspective view of FIG. 1 shows a bezel 12 which serves as an encapsulated frame for a front lens assembly of pushbutton 10 which is better illustrated and described below in connection with FIG. 2. Bezel 12 is made of black anodized aluminum alloy and is snapped over a molded plastic lamp box 14. Lamp box 14, in turn, is coupled to an assembly insulation plate 16 into which lamps 18 are disposed, the rear ends of which can be seen in FIG. 1. An alignment pin 22 and detent mechanism 24 extend from the base of assembly insulation plate 16 for appropriate coupling to a conventional switching mechanism which will not be discussed in the present application. Pushbutton 10, which is shown in a rear assembled view in FIG. 1, is illustrated in its various component parts in exploded perspective frontal view in FIG. 2.

The rectangular frame provided by bezel 12 is clearly illustrated in FIG. 2. Openings 26 on the sides of bezel 12 provide a means of engagement with snap tabs 28 of lamp housing 14. One of the snap tabs 28 is illustrated in FIG. 2 with the opposing snap tab being hidden in the perspective view. A rubberized seal base plate 30 slip fits into bezel 12 thereby sealing the interior edges of bezel 12. The lens assembly 32 is disposed within the interior perimeter of seal base plate 30. Lens assembly 32 is a composite or laminate of multiple layers and shaded glass or plastic. An interior layer sandwiched between the front and back protective layers carries a readable legend or other symbols can be arbitrarily chosen. Thus, lens assembly 32 may include a legend which indicates overheated engine, low fuel, on target, or any other message or warning with which pushbutton switch 10 is associated.

In the illustrated embodiment, lens assembly 32 is a grey neutral filter and is backed by a white translucent diffuser plate 34 which serves to diffuse the backlit illumination, discussed below, which is evenly diffused across lens assembly 32. As will be described below, the color projected through diffuser plate 34 and lens assembly 32 will be largely determined by the source of illumination contained within pushbutton 10.

Disposed behind diffuser plate 34 is an EMI/RFI shield 36 which serves to electromagnetically isolate the interior of the pushbutton 10 and its associated switching mechanism from the ambient. RFI shield 36 is a conventional metallized open lattice or grid which allows substantial portion of lights to penetrate therethrough but has a grid spacing sufficient to be electromagnetically opaque at frequencies below the optical frequencies. The inclusion of EMI/RFI shield 36 is optional and may be omitted, if desired.

Shield 36, diffuser plate 34, lens assembly 32, and seal base plate 30 compactly nest together and fit within bezel 12. This allows bezel 12 to be snapped over the front portion of light box 14 and secured by snap tabs 28.

Lamp housing 14 is a plastic, metallized square box with a rear surface with four holes 38 symmetrically defined therethrough in an open face. Holes 38 are dimensioned to provide a body hole for color filters 40 and 42. Rear surface 44 of lamp box 14 is divided into quadrants with a hole 38 defined through the center of each quadrant. The local surface of a quadrant is curved to approximate a parabolic reflecting surface in the vicinity of hole 38 and around filter caps 40 and 42 which are disposed therethrough.

Further details concerning filter caps 40, 42 are described in connection with FIGS. 3 and 4 below. Filter caps 40 and 42 have an annular basal lip 46 which fits into a mating annular ring (not shown) defined into rear wall 44 of lamp box 14. Thus, filter caps 40 and 42 fit flushly within the rear wall of lamp box 14. Assembly insulation plate 16 is a metallized, plastic, square fitting which is open on one side 48 and has a plurality of retaining tabs 50 which are integral with and extend from adjacent sides 52 of plate 16. Tabs 50 of sides 52 are designed to extend over a lip 54 defined around the perimeter of the rear exterior edge of lamp box 14. Thus, as illustrated in FIG. 2, lamp box 14 is inserted into insulation plate 16 from the right side 48 of plate 16. Sides 52 and tabs 50 are dimensioned so that the inside surface of tabs 50 slide over the forward surfaces of lip 54 of lamp box 14. Lamp box 14 and insulation plate 16 are thus snugly fitted together with filter caps 40 and 42 in place within lamp box 14 and captured therein by insulation plate 16.

Holes 56 are defined through insulation plate 16 and provide a means for insertion of conventional incandescent lamps 18 through holes 36 and into filter caps 40 and 42. A stamped metallic plate 58, depicted in FIG. 1, is riveted by plastic rivets 60 to the rear surface of insulation plate 16. Holes 56 are defined through metallic plate 58 in such a manner that a plurality of resilient metallic fingers 65 extend into holes 56. Thus, as lamps 18 are disposed through holes 56, fingers 62 come into secure sliding contact with the metallic base 64 of each lamp 18. Therefore, electrical contact is made to one terminal 18 through base 58. The other terminal of each lamp 18 is exposed for direct contact as shown in the rear perspective view of FIG. 1.

A protection plate 66 may be provided for fixation over plate 58 in the case where no lamps are utilized or dummy lamps are inserted. Otherwise, protection plates 56 is removed and lamps 18 are accessible to conventional switching apparatus for appropriate selective activation by conventional circuitry.

Turn now and consider in greater detail color filter caps 40 and 42 which are depicted in enlarged scale in side cross-sectional view in FIG. 3, and in rear plan view in FIG. 4. For the purpose of illustration, color filter 40 is illustrated in FIGS. 3 and 4 Filter 42 is otherwise structurally identical.

Turning to FIG. 3, color filter 40 is a domed glass filter approximately 1 mm or 0.040 of an inch thick as manufactured by Kopp Glass, Inc. of Pittsburgh, PA. In the illustrated embodiment, filter 40 has a dome height 70 of approximately 0.240 inch, and dome width 72 of approximately 0.225 inch. Lip 46 is defined around the exterior periphery of the base of lamp 14, and is provided with a bevelled opening into interior 76. The bulb portion of incandescent lights 18 extend into interior space 76.

According to the invention, color filter caps 40 and 42 are provided with a differing colors. For example, color filter caps 40 are composed of red glass, and color filter caps 42 are composed of green glass. Red filters 40 provide a source of illumination with a spectral range equal to that of conventional night illumination. However, color filters 42 are provided with a spectral range denoted by ANVIS (Aviation's Night Vision Imaging System) Green A or ANVIS Green B. Alternatively, color filter 42 may be yellow, or more particularly, ANVIS yellow, all of which colors are particularly adapted to night vision goggles. Specifications for the spectral range of these colors are set forth in MIL-L-85762 (Jan. 24, 1986). In particular, the chromaticity of ANVIS Green A in a UCS diagram is $U'=$ to 0.088, $V'=0.543$ and a radius of 0.037. ANVIS Green A is recommended for instruments, monochromatic displays, controls, consoles, caution and advisory signals, and compartment/utility lighting. Similarly, ANVIS Green B is defined in a UCS diagram by the parameters: $U'=0.131$, $V'=0.623$ and a radius of 0.057. ANVIS Green B is recommended for special lighting system components where increased display emphasis by highly saturated colors is deemed necessary or adequate display daylight readability cannot be achieved with ANVIS Green A. ANVIS Green Yellow is defined by the chromaticity, $U'=0.274$, $V'=0.622$ and a radius of 0.083 for master warning and caution indicators. The technique applies equally well to other night vision compatible colors as may be defined. The graphic depiction of these colors on a UCS diagram is illustrated in an article entitled "Impact of Night Vision Imaging System Compatible Aircraft Lighting Specification on Crewstation Design," presented to the Aerospace Lighting Institute, Advanced School/Seminar in Los Angeles, California, on Feb. 12, 1986, by C. Pieroway of C&P Enterprises of Dayton, Ohio.

Therefore, according to the present invention, during daylight all lamps 18 may be activated to provide an essentially white light to back-illuminated lens assembly 32. However, at night only those lamps 18 associated with red night light filters 40 would be illuminated for night vision compatible with an unassisted eye. When night vision goggles are utilized, only those lamps 18 associated with ANVIS colored filters 42 would be illuminated. Each of these various types of light sources are thus contained in a single lamp box 14 within a single pushbutton switch 10. Pushbutton switch 10 may be only ⅝ of an inch on the side, so that the assembly of FIG. 2 provides multiple selections of light sources within a very small space. This was not previously possible because all previous ANVIS filters were flat. According to the present invention, the night vision ANVIS colored filters 42 assume the dome shape depicted in FIGS. 3 and 4. A dome-shaped filter additionally provides a large radiating surface in a very small volume.

Switching between lamps 18 corresponding to filters 40 and 42 is provided by conventional means. The user can quickly convert all pushbutton or warning switches from daylight to red night vision, or from daylight to an ANVIS system, or from a red night vision to an ANVIS illumination. The switching may in fact be automatically effectuated whenever the night vision goggles are operated. In addition, increasing the voltage or power output of selected ones of lamps 18 may cause the transmitted infrared portion to increase somewhat without change in the intensity of any visible color. Therefore, the visibility of the displays when viewed by the night vision goggles can be increased without increasing visible luminance.

Many modifications or alterations may be made by those having ordinary skill in the art without departing from the spirit and scope of the invention. For example, although the illustrated embodiment as described in connection with a pushbutton switch, it must be clearly understood that other types of displays or instrumentation may incorporate the invention. For example, the invention may be employed not only within instrumentation or control display devices, but also may be incorporated into other devices used in combination with an ANVIS system, such as gun sights and the like. Therefore, the illustrated embodiment is shown only by way of example and should not be taken as limiting the invention as defined in the following claims.

We claim:

1. An apparatus for selectively illuminating a display for compatible unassisted night vision illumination and illumination for a night vision imaging system, comprising:
   a light box;
   a plurality of three-dimensional filter elements disposed in said light box, said light box disposed behind said display, at least one of said three-dimensional filter elements having a predetermined spectral transmissivity compatible with said night vision imaging system;
   wherein at least one other one of said plurality of three-dimensional filter elements has a spectral transmissivity in a wavelength range compatible with uansssisted night vision, and
   means for selectively illuminating said plurality of said three-dimensional filter elements, including selectively illuminating all of said plurality of filter elements for daytime vision,
   whereby said apparatus illuminates said display in compatible manner with night vision imaging systems unassisted night vision and daytime vision.

2. An apparatus for selectively illuminating a display for compatible unassisted night vision illumination and illumination for a night vision imaging system, comprising:
   a light box;
   a plurality of three-dimensional filter elements disposed in said light box, said light box disposed behind said display, at least one of said three-dimensional filter elements having a predetermined spectral transmissivity compatible with said night vision imaging system; and
   means for selectively illuminating said plurality of said three-dimensional filter elements, including selectively illuminating all of said plurality of filter elements for daytime vision,
   whereby said apparatus illuminates said display in compatible manner with night vision imaging systems unassisted night vision and daytime vision,
   wherein at least one half of said plurality of three-dimensional filter elements has a spectral transmissivity compatible with said night vision imaging system, and wherein each of the remaining one of said plurality of three-dimensional filter elements has a spectral transmissivity and wavelength range compatible with unassisted night vision.

3. The apparatus of claims 1 or 2 wherein said at least one three-dimensional filter element has a spectral transmissivity characterized by a selected one of the colors, ANVIS Green A, ANVIS Green B, and ANVIS Yellow.

4. An apparatus for selectively illuminating a display for compatible unassisted night vision illumination and illumination for a night vision imaging system, comprising:
   a light box
   a plurality of three-dimensional filter elements disposed in said light box, said light box disposed behind said display, at least one of said three-dimensional filter elements having a predetermined spectral transmissivity compatible with said night vision imaging system; and
   means for selectively illuminating said plurality of said three-dimensional filter elements,
   whereby said apparatus illuminates said display in compatible manner with night vision imaging systems,
   wherein one of said plurality of three-dimensional filter elements are characterized by distinct spectral transmissivities compatible with said night vision imaging system, and with unassisted night vision,
   wherein, at lest one of said plurality of three-dimensional filter elements is characterized by spectral transmissivity compatible with unassisted daylight vision.

5. The apparatus of claim 4 wherein said at least one three-dimensional filter elements has a spectral transmissivity approximately equal to ANVIS Green A.

6. The apparatus of claim 4 wherein said at least one three-dimensional filter elements has a spectral transmissivity approximately equal to ANVIS Green B.

7. The apparatus of claim 4 wherein said at least one three-dimensional filter element has a spectral transmissivity approximately equal to ANVIS Yellor.

8. An apparatus for illumination of a display for unassisted daylight vision, unassisted night vision, and vision with a night vision imaging system comprising:
   a plurality of light sources;
   a corresponding plurality of individual filter elements disposed over each light source, light being emitted by said light source and transmitted through said corresponding filter element, the transmitted light being characterized by the spectral transmissivity of each corresponding filter element, at least one of said filter elements being characterized by a spectral transmissivity compatible with said night vision imaging system and at least one other one of said plurality of filter elements having a spectral transmissivity compatible with a selected one of said daytime vision and unassisted night vision;
   a light box for receiving said plurality of filter elements and light sources contained within said filter elements, said light box characterized by an internal reflecting surface; and
   means for embodying said display opposing said plurality of filter elements and light sources disposed within said light box,
   whereby a single apparatus is provided for illumination of said display under variable spectral vision illumination conditions.

9. The apparatus of claim 8 wherein each of said plurality of filter elements is a glass domed filter.

10. The apparatus of claim 8 wherein at least one of said filter elements has a spectral transmissivity approximately equal to a selected one chosen from ANVIS Green A, ANVIS Green B, and ANVIS Yellow.

11. The apparatus of claim 10 wherein each of said plurality of filter elements is a glass domed filter.

12. The apparatus of claim 10 wherein at least another one of said plurality of filter elements has a spectral transmissivity compatible with unassisted night vision.

13. A method for selectively providing illumination of a display with a selected spectral range compatible with a night vision imaging system, unassisted daytime vision, and unassisted night vision, comprising the steps of:

selectively activating the light source enclosed within a three dimensionally shaped filter, said filter having a selected spectral transmissivity corresponding to said night vision imaging system;

selectively illuminating a second light source enclosed within said three dimensionally shaped filter disposed adjacent to said display, said second filter having a spectral transmissivity compatible with said unassisted night vision; and selectively activating both said first and second light sources to illuminate said display with a spectral range compatible with said unassisted daytime vision.

* * * * *